(12) United States Patent
Ekpar et al.

(10) Patent No.: US 6,671,400 B1
(45) Date of Patent: Dec. 30, 2003

(54) PANORAMIC IMAGE NAVIGATION SYSTEM USING NEURAL NETWORK FOR CORRECTION OF IMAGE DISTORTION

(75) Inventors: Frank Edughom Ekpar, Toyama (JP); Shinya Yamauchi, Katano (JP)

(73) Assignee: Tateyama R & D Co., Ltd., Toyama (JP)

( * ) Notice: Subject to any disclaimer, the term of this patent is extended or adjusted under 35 U.S.C. 154(b) by 590 days.

(21) Appl. No.: 09/695,881

(22) Filed: Oct. 26, 2000

(30) Foreign Application Priority Data

Sep. 28, 2000 (JP) ........................ 2000-297723

(51) Int. Cl.[7] .............................................. G06K 9/00
(52) U.S. Cl. ...................................................... 382/157
(58) Field of Search ................................ 382/156, 157; 706/2, 6, 15, 16; 700/47, 48

(56) References Cited

U.S. PATENT DOCUMENTS

| | | | |
|---|---|---|---|
| 4,566,763 A | 1/1986 | Greguss | 350/441 |
| 4,728,839 A | 3/1988 | Coughlan et al. | 310/112 |
| 5,185,667 A | 2/1993 | Zimmermann | 358/209 |
| 5,434,713 A | 7/1995 | Sato | 359/725 |
| 6,005,611 A | 12/1999 | Gullichsen et al. | 348/211 |
| 6,263,103 B1 * | 7/2001 | Freeman et al. | 382/173 |

* cited by examiner

Primary Examiner—Samir Ahmed
Assistant Examiner—Vikkram Bali
(74) Attorney, Agent, or Firm—Connolly Bove Lodge & Hutz LLP

(57) ABSTRACT

A system permitting one or more users to navigate a wide-angle image, and in particular a panoramic image, using a neural network to correct distortion in that image. To train the neural network, a calibration pattern which defines an array of calibration points is disposed to occupy a field of view of a wide-angle imaging apparatus, and a calibration image is thereby captured by the apparatus. Respective view directions of the calibration points and the positions of these points in the calibration image are used as data for training the neural network to correctly match view directions to corresponding intra-image positions. Subsequently, to generate an undistorted sub-image of an arbitrary distorted wide-angle image, an array of display pixel positions are expressed as a corresponding set of view directions, and the neural network used to convert these to a corresponding set of positions within the wide-angle image, with the video attributes at these positions being then assigned to the corresponding pixels of the sub-image.

9 Claims, 8 Drawing Sheets

INPUTS    SUMMING UNIT    ACTIVATION FUNCTION    OUTPUT $$u_i = \sum_j \omega_{ij} x_j \qquad y_i = f(u_i)$$

INPUT LAYER    HIDDEN LAYER    OUTPUT LAYER

PANORAMIC IMAGE NAVIGATION SYSTEM USING NEURAL NETWORK FOR CORRECTION OF IMAGE DISTORTION

BACKGROUND OF THE INVENTION

1. Field of the Invention

The present invention relates generally to the field of image processing for correction of image distortion produced by a wide-angle imaging system. In particular, the invention relates to a system permitting interactive navigation within a wide-angle image such as a panoramic image in a manner that is free of image distortion.

2. Description of the Prior Art

Recently, there has been unprecedented interest in research and application development in the fields of immersive panoramic imaging, telepresence and virtual reality. Immersive panoramic imaging applications permit a user to immerse himself in a representation of a remote scene with the ability to look in any desired direction in the scene, limited only by the field of view of the imaging system employed. Immersive telepresence applications permit live omni-directional viewing of remote locations while immersive virtual reality generally involves the synthesis of immersive content.

A major problem with immersive panoramic imaging systems is how to encode enough visual information to make the system practical and cost-effective. One solution to this problem involves using an orientation sensing device to sense the orientation of the user and then using the input to rotate a conventional camera to cover the field of view indicated by the user's orientation. Such a system is described in U.S. Pat. No. 4,728,839 awarded to Coughlan et al. Apart from the obvious handicap of not being able to permit more than one user to comfortably navigate the remote scene, the inherent delay between the transmission of the orientation signal and the positioning of the camera to coincide with the desired orientation severely limits the practical value of this system. A more elegant solution to the problem is to use a panoramic imaging system. U.S. Pat. No. 4,566,763 awarded to Greguss Pal describes one such solution. The fish-eye lens system described in U.S. Pat. No. 5,434,713 awarded to Sato Haruo is yet another solution. Panoramic imaging systems, however, introduce significant amounts of non-linear geometric distortion into the images they produce and so for these images to be viewed comfortably by a human being, they need to be de-warped. The distortion is generally referred to as perspective distortion in the literature and the process of correcting the distortion is referred to as the generation of perspective-corrected views.

Several solutions to the perspective distortion problem exist. One such solution is described in U.S. Pat. No. 5,185,667 awarded to Steven Zimmermann. Zimmermann describes a system utilizing complicated trigonometric transformations and assuming a mathematically ideal fish-eye lens. Since real fish-eye lenses deviate somewhat from the ideal, the application of the system described in the '667 patent is at best limited to situations where the inevitable errors arising from the assumption of idealness can be tolerated. Even in such applications, the method cannot be extended to panoramic imaging systems other than the fish-eye lens. The solution described in U.S. Pat. No. 6,005,611 awarded to Gullischen et al remedies some of the limitations of the system presented in the '667 patent. The 611 patent uses control points obtained via a set of projection equations and a global bivariate polynomial to correct the perspective distortion. Although the solution presented in the '611 patent is simpler and faster than that of the '667 patent, it relies on the use of the perspective projection equations of the fish-eye lens for the generation of the control points. Since these equations assume an ideal fish-eye lens, the method is of limited practical importance. Furthermore, attempting to extend the method of the '611 patent to other panoramic imaging systems would require the determination of the projection equations of those panoramic imaging systems. The determination of these equations, where feasible in the first place, is at best tedious. Usually, the projection equations assume mathematical idealness for the panoramic imaging systems and as such the method of the '611 patent still suffers one of the major drawbacks of the method described in the '667 patent.

In view of the foregoing, there has been a substantial need for a system that permits the construction of perspective-corrected views from an arbitrary panoramic imaging system that obviates the need to derive the projection equations of the panoramic imaging system or to assume a mathematically ideal panoramic imaging system. There has also been a need for a system that can permit such construction at real-time (typically 30 frames per second) rates on a general-purpose computer.

Furthermore, there has been a substantial need for a system that permits the construction of perspective-corrected views from an arbitrary panoramic imaging system to an arbitrary degree of accuracy so that systems relying on accurate measurements based on the perspective-corrected views could be built.

It should be noted that although in the following the features of the present invention will be described and claimed with respect to a panoramic navigation system, it will become apparent that the invention teaches a method and apparatus for training and utilizing a neural network which would be applicable to obtaining undistorted images from other distorted wide-angle images, so that the scope of the invention is not limited to processing of panoramic images.

In the following, the term "image distortion" is to be understood as applying to both inherent (predictable) distortion, such as occurs in an annular image of a panoramic 3-dimensional scene, and to complex non-linear distortion such as optical distortion produced by an imaging system, whereby directions of incident light rays which pass through a reference origin point of an optical lens unit are not accurately mapped onto image positions.

SUMMARY OF THE INVENTION

It is an objective of the present invention to overcome the disadvantages of the prior art set out above, and in particular to provide an image navigation system whereby an arbitrary region of a distorted panoramic image which has been captured by an imaging apparatus can be selected to derive a corresponding view image that is substantially free from distortion.

To achieve that objective, the invention permits the construction of a panoramic navigation system, in which image distortion correction is accomplished by a neural network. The neural network is trained beforehand by utilizing a calibration pattern having an array of visible calibration points defined thereon. Specifically, the calibration pattern is disposed surrounding a lens unit of a panoramic imaging system, and a (distorted) calibration panoramic image of the calibration pattern is captured by that system. The respective view directions of the calibration points on the calibration pattern with respect to a reference origin point of the lens unit are calculated or measured, and these directions are then matched against the respective positions at which the corresponding calibration points appear within the calibration image, e.g., with each of the directions specified as a pair of (elevation, azimuth) angular coordinates. The neural network is then trained, by using the set of calibration directions as inputs to the neural network, with the corresponding response outputs from the network being compared with sets of coordinates expressing the corresponding positions of the calibration points within the calibration image, to obtain error quantities for use in modifying internal parameters (e.g., weight values of neuron connections) of the neural network, using a suitable algorithm, until it is judged that a sufficient degree of training has been achieved.

Once the neural network has been trained, then when a portion of an arbitrary distorted wide-angle image is to be displayed as an undistorted sub-image, e.g., displayed in a view window formed of a rectangular array of pixels in a display screen, a specific viewing direction is specified for the sub-image by a user, and is thereby assigned to a centrally located pixel of the view window. Next, for each of the other pixels of the view window, a corresponding view direction is calculated based upon the view direction of the central pixel and the position of that other pixel with respect to the central pixel.

The set of view directions thus obtained are then successively inputted to the trained neural network to thereby obtain, as responses from the neural network, information specifying positions within the distorted wide-angle image that respectively correspond to the inputted directions.

The video attributes of pixels at each of these positions in the distorted wide-angle image (i.e., with each such position being matched to a specific view direction and hence to a specific pixel position in the view window) are then extracted, and assigned to the corresponding pixels of the view window. In that way, an undistorted sub-image appears in the view window, which corresponds to an image which would be seen by looking at a selected part of the original real-world scene along the specified view direction.

The generation of the location data by the neural network primarily involves a simple series (the number depends on the complexity of the distortion of the panoramic imaging system) of multiplications and additions and for most available panoramic imaging systems the number of multiplications and additions required is low enough to permit simultaneous real-time navigation of the panoramic image by a plurality of users on a general-purpose personal computer. The undistorted sub-image, formed of the data extracted from the distorted panoramic image as described above, is then displayed on a suitable display system such as a computer monitor.

In the present invention, the formation of a distorted 2D image from the undistorted 3D real world scene by a panoramic imaging system is considered as an input-output mapping of directions defined with respect to a specific point in three-dimensional space onto respective points in a two-dimensional image. Artificial neural networks have been shown to be capable of approximating an arbitrary input-output mapping to an arbitrary degree of accuracy. The ability of a neural network to approximate the characteristic distortion of the panoramic imaging system to an arbitrary degree of accuracy permits the use of this invention in applications (such as machine vision-based industrial process control) that rely on accurate measurements of parameters from panoramic images.

The invention relies only on sample data from an image captured using the particular panoramic imaging system in use and so obviates the need to make any assumptions of mathematical idealness about the panoramic imaging system. Furthermore, the derivation of the projection equations of the panoramic imaging system is rendered unnecessary. Hence, any panoramic imaging system can be used and its characteristic distortion can be approximated to any desired degree of accuracy.

Accordingly, it is an object of the present invention to provide a system for the construction of arbitrary distortion-corrected views from a panoramic image captured with an arbitrary panoramic imaging system.

It is another object of the present invention to permit a plurality of users to simultaneously view the same or different perspective-corrected views of a panoramic image captured with an arbitrary panoramic imaging system.

It is yet another object of the present invention to permit the approximation of the characteristic distortion of an arbitrary panoramic imaging system to an arbitrary degree of accuracy so that systems relying on accurate measurements based on the perspective-corrected views could be built.

Additionally, it is an object of the present invention to achieve all the foregoing without requiring the determination of the projection equations of the panoramic imaging system or any assumptions of idealness concerning the panoramic imaging system.

These and further objects of the present invention will become clear in the detailed description that follows.

DETAILED DESCRIPTION OF THE PREFERRED EMBODIMENTS

Figure 1:
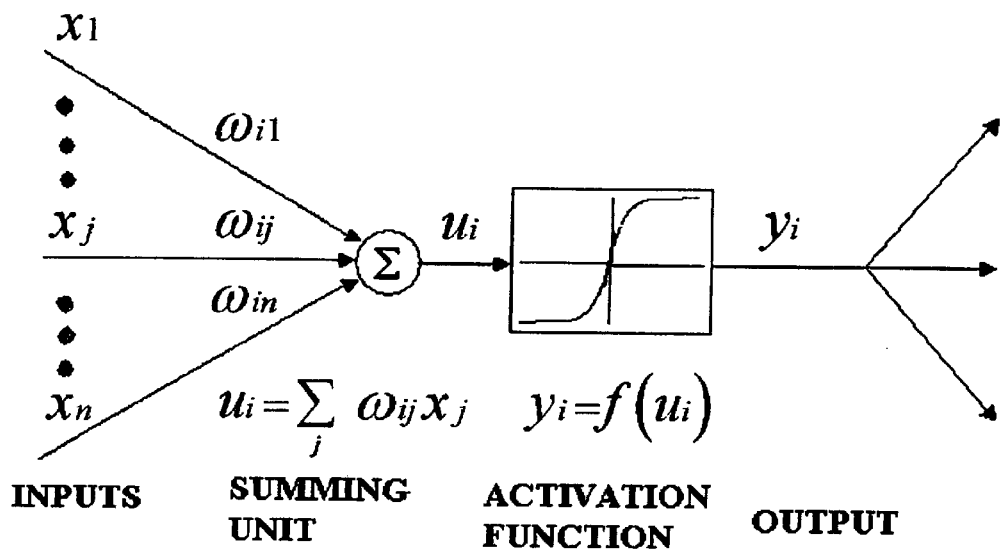
FIG. 1 is a representation of the major components of an artificial neural network.

For an understanding of the methods described in the present invention, it is necessary to give a brief overview of artificial neural networks. Artificial neural networks are nonlinear mapping systems consisting of simple processing units modeled loosely on the structure and principles of operation of the neurons found in the nervous systems of humans and animals. Accordingly, the processing units that constitute artificial neural networks are often referred to as artificial neurons. The components of biological neurons modeled by artificial neurons are the branching dendritic tree that distributes and collects signals from neighboring neurons, the cell body whose function is to integrate the signals and generate a response, and the branching axon that serves to distribute the response of the cell body to neighboring neurons. As FIG. 1 shows, the important components of biological neurons have their analogs in artificial neurons. A biological neuron produces a response that depends both on its internal state and its inputs. However, the response of a neuron is thought to be determined mainly by the strengths (weights) of its connections. Referring now to FIG. 1, the response, y, of an artificial neuron is typically of the form $$y = f\left(\sum_i w_i x_i\right) \quad (1)$$

where f( ) is the so-called activation function (typically a simple nonlinear function), $W_i$ are the weights of the connections, and $X_i$ are either external inputs or the outputs of neighboring neurons. Equation (1) is by no means the only method of computing the response of an artificial neuron but is widely used.

Figure 2:
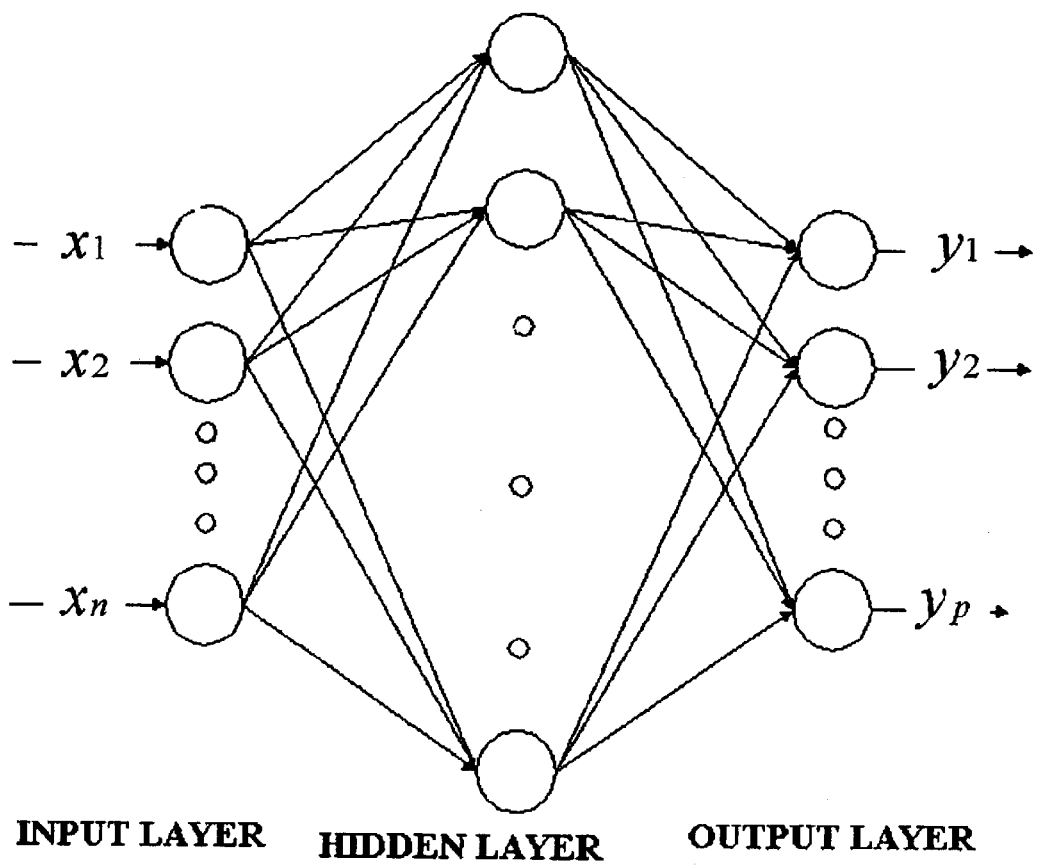
FIG. 2 shows a three-layer network of artificial neurons.

By connecting several artificial neurons to form networks with a wide variety of topologies, artificial neural networks capable of a wide variety of interesting and useful behaviors can be obtained. Artificial neural networks are typically used as nonlinear input-output mapping systems. The type of input-output mapping or function realized by an artificial neural network depends on the connections in the network. It has been shown that an arbitrary function satisfying certain broad constraints can be approximated to an arbitrary degree of accuracy by an artificial neural network of suitable size and structure. Although the structure of a neural network can be chosen arbitrarily, layered networks are very widely used. Layered networks have neurons arranged in layers and connected in such a way that neurons in a particular layer receive signals from the previous layer and propagate outputs (responses) to the next layer. External inputs are fed into the first layer and the outputs of the network are obtained from the last layer. The layers in between are not directly observable from the inputs or outputs and are thus usually referred to as hidden layers. FIG. 2 is an example of a three-layer neural network.

Much like their biological counterparts, artificial neural networks are capable of learning from examples. The neural network learns from previous examples through a process of training. Although there exist so-called self-organizing artificial neural networks capable of learning from input data without the benefit of supervision, the present invention is directed towards the use of artificial neural networks that require supervised training to learn the underlying function in the training data and thus model the system the data represents.

Supervised training involves the use of two exemplar data sets. One set represents the inputs while the other set represents the response of the system to be modeled. The latter data set is used as the desired response of the neural network. During training, the network is presented with input data and its response is compared with the desired output. The difference between the actual output of the network and the desired response, referred to as the error of the network can then be used in conjunction with one of several training algorithms to modify the weights of the connections in the network in such a way as to minimize the error. This process is carried out recursively until specified criteria are met. One of the most popular methods of training neural networks is known as back-propagation.

When the network is deemed to have sufficiently learnt the underlying characteristics of the system represented by the training data, its weights are stored and can then be used at a later time to obtain reasonable responses to inputs, some of which might not have been in the original training set. The ability of the trained neural network to give reasonably accurate responses to input data that were not originally in the training set is called generalization and is duly exploited by the present invention.

According to the present invention, the formation of a distorted panoramic image from the undistorted real world scene by a panoramic imaging system is an input-output mapping between coordinates in the undistorted object space and coordinates in the distorted image space. For any given panoramic imaging system, two sample data sets, one representing the undistorted real world coordinates and the other representing the distorted panoramic image coordinates are obtained. The data so obtained is then used to train a neural network complex enough to approximate the particular panoramic imaging system to the degree of accuracy desired.

In the description of an embodiment of the present invention that follows, a specific algorithm for automatically constructing a suitable neural network is presented. However, a priori knowledge about the complexity of the particular panoramic imaging system to be used could serve as the basis for manually selecting the optimum network architecture. Additionally, there exist a very wide variety of constructive algorithms, e.g. cascade correlation (a constructive algorithm that generates non-layered networks), meiosis networks, etc that could be used.

Figure 4:
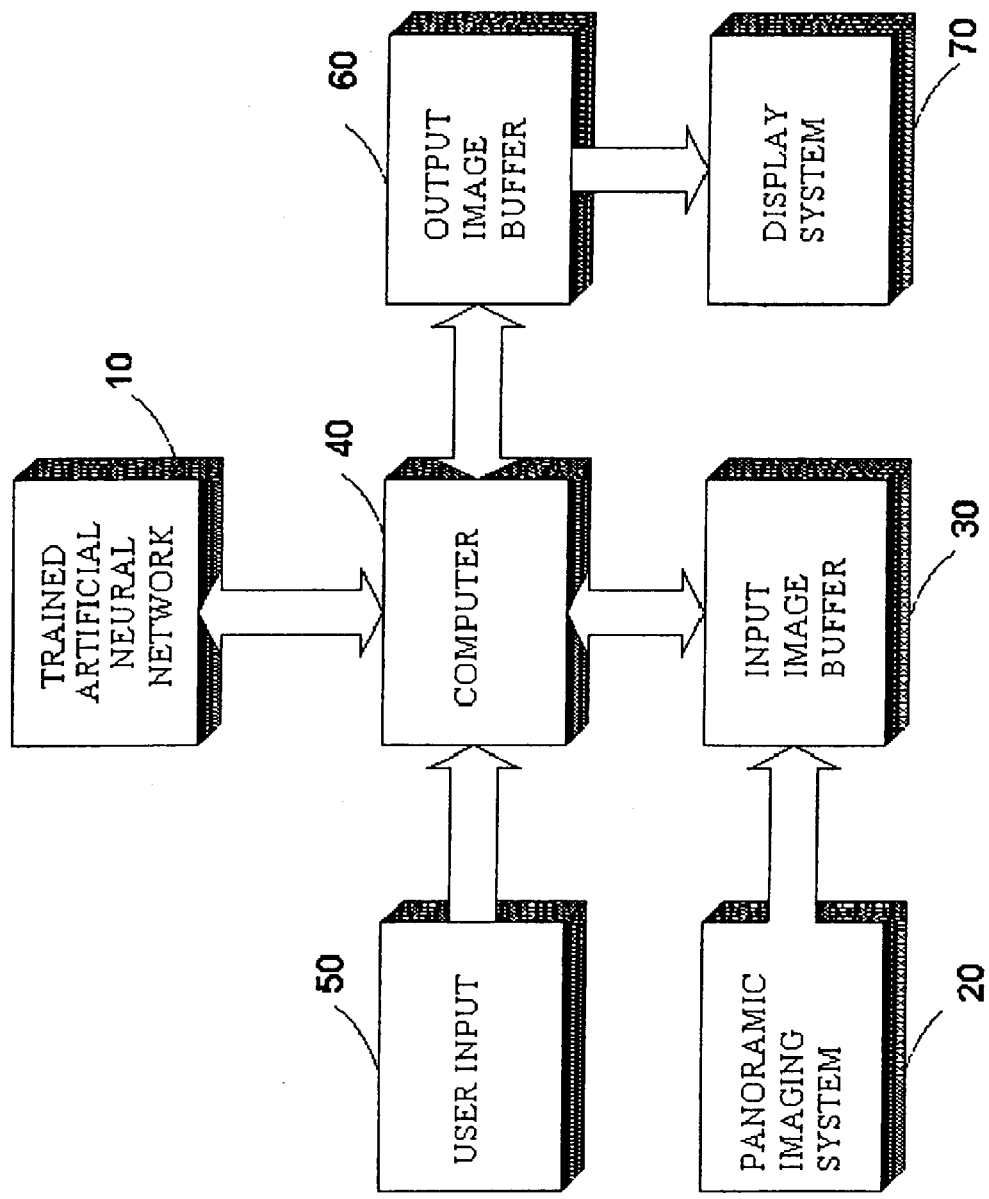
FIG. 4 is a block diagram of an embodiment of the present invention.

FIG. 4 illustrates an embodiment of the present invention. The panoramic imaging system 20, comprising the combination of a panoramic lens assembly, such as the panoramic imaging block described in U.S. Pat. No. 4,566,763 and a video or still image camera, produces a distorted panoramic image of the real world scene.

Figure 5:
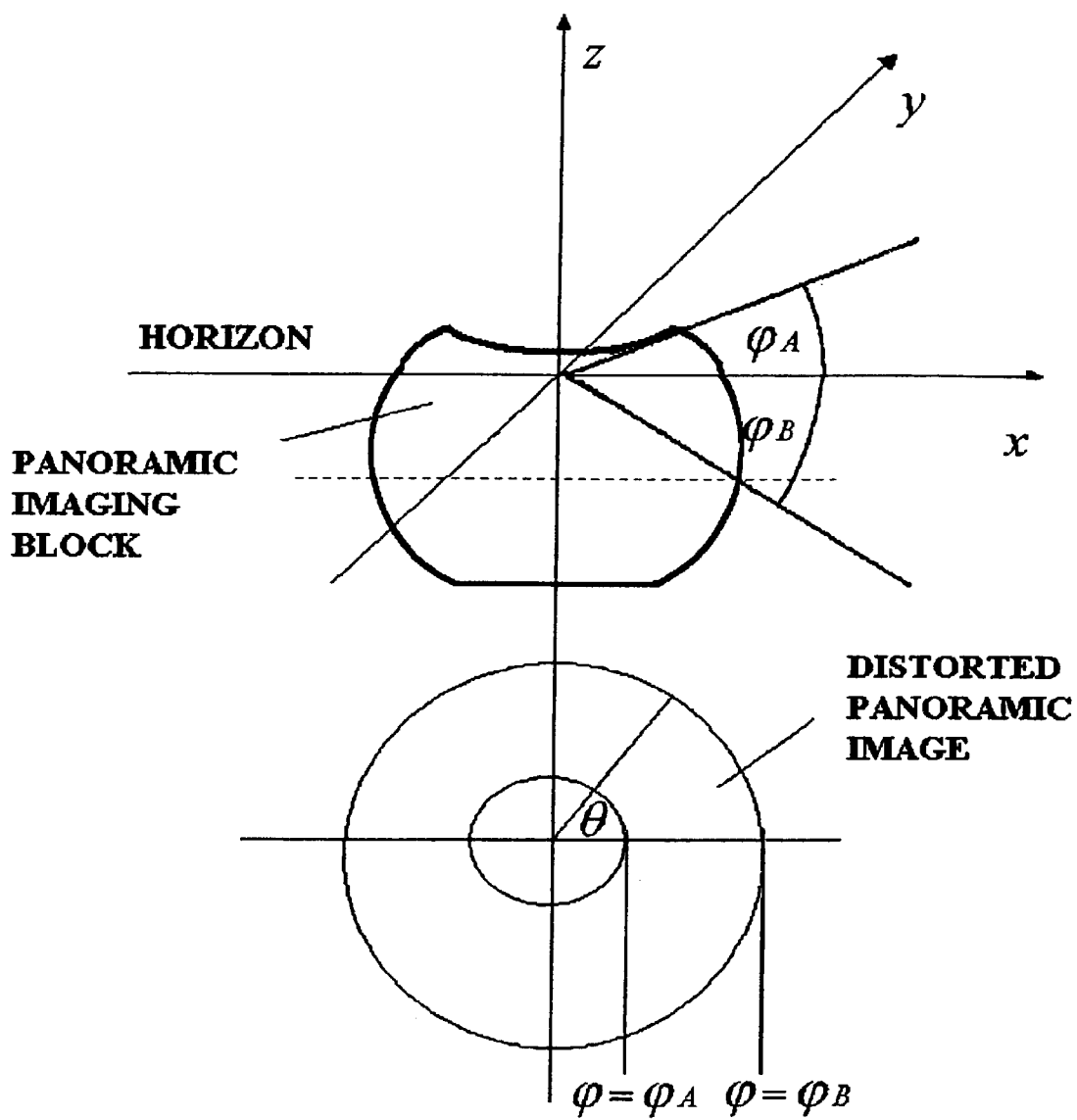
FIG. 5 depicts the generation of a distorted annular panoramic image by a panoramic imaging system.

The panoramic imaging block described in the '763 patent comprises a compact assembly of several reflecting and refracting surfaces. Hereinafter, this panoramic imaging system shall be referred to simply as the PAL (Panoramic Annular Lens) system. It generates a donut-shaped planar annular image as illustrated in FIG. 5, in which the panoramic imaging block is designated by numeral 80, and the origin point of that panoramic imaging block is designated by numeral 81, and corresponds to the origin of the x,y,z coordinate system shown in FIG. 5. The central axis of the panoramic imaging block 80, i.e., an axis which is in general oriented close to the vertical direction of a real-word scene which is being captured, corresponds to the z-axis of the x,y,z coordinate system. The term "origin point" of a wide-angle lens unit is used herein with the significance of a reference point which constitutes the origin of the view directions of the lens unit, i.e. the azimuth and elevation angular components of a view direction are measured with respect to that origin point 81.

For simplicity of description, a plane which extends through the origin point 81 perpendicular to the central axis, i.e., the x-y plane in FIG. 5, will be considered to be the plane of the horizon, although it need not correspond to an actual horizon in a real-world scene. The PAL system has a 360-degree lateral field of view and a vertical field of view that could be as wide as 180 degrees. The maximum angle above the horizon is denoted by $\phi_A$ while the minimum angle below the horizon is denoted by $\phi_B$. Points in the real world object space (viewed from the origin point 81) which are oriented at respectively different angles of elevation will appear on respectively different concentric circles in the PAL image. Similarly, points in the real world object space which are oriented at respectively different directions of elevation that are mutually parallel (i.e., lie within a common vertical plane which passes through the central axis of the panoramic imaging block) are projected onto a radial line in the PAL image.

The output of the video camera is digitized by video digitizing circuitry that could be onboard the camera, inside the general-purpose computer indicated as 40 or part of a stand-alone digitizing device. Digitization could take place at real-time (typically 30 frames per second) rates. The digitized panoramic image is then stored in a suitable memory device, indicated generally as 30 so that the image is accessible to the computer, 40. This could be the random access memory (RAM) of the computer 40 or any suitable storage medium connected operatively to the computer 40. The image could be made to pass through an anti-aliasing stage or any other suitable preprocessing stage before or after storage in 30.

The computer 40 could be any of a variety of personal computers which are now available In FIG. 4, the trained neural network is indicated generally as 10 and can be accessed by the computer 40. The network could reside in the RAM of the computer 40. The trained neural network 10 is represented by a description of its structure and a set of weight values corresponding to the strengths of its connections at the end of the training session.

User input data 50 could be obtained via the combination of a suitable input device such as a computer mouse and a suitable input port on the computer 40. The user input data 50 specifies at least a position on the distorted panoramic image, as a direction (pair of angular coordinates) which corresponds to a particular direction with respect to the aforementioned origin point of the PAL system, i.e., is within the range of elevation and azimuth angles which are covered by the PAL system. In addition, the user input may also specify a size for the undistorted output image (i.e., the number of pixels to be used to form a view window which forms that output image as a rectangular array of pixels in a display screen), a zoom level, and parameters describing the desired orientation of the output image.

Software running on the computer 40 combines the user input data 50 ad the distorted panoramic image held in the input image buffer 30 with the operation of the trained neural network 10 to generate an undistorted image that is stored in the output image buffer 60. Again, the output image buffer 60 could reside in the RAM of the computer 40 or any other suitable storage device.

The perspective-corrected view stored in the output image buffer 60 is then displayed on a suitable display device indicated generally as 70. The display device 70 could be a computer monitor or a head-mounted display.

Figure 3:
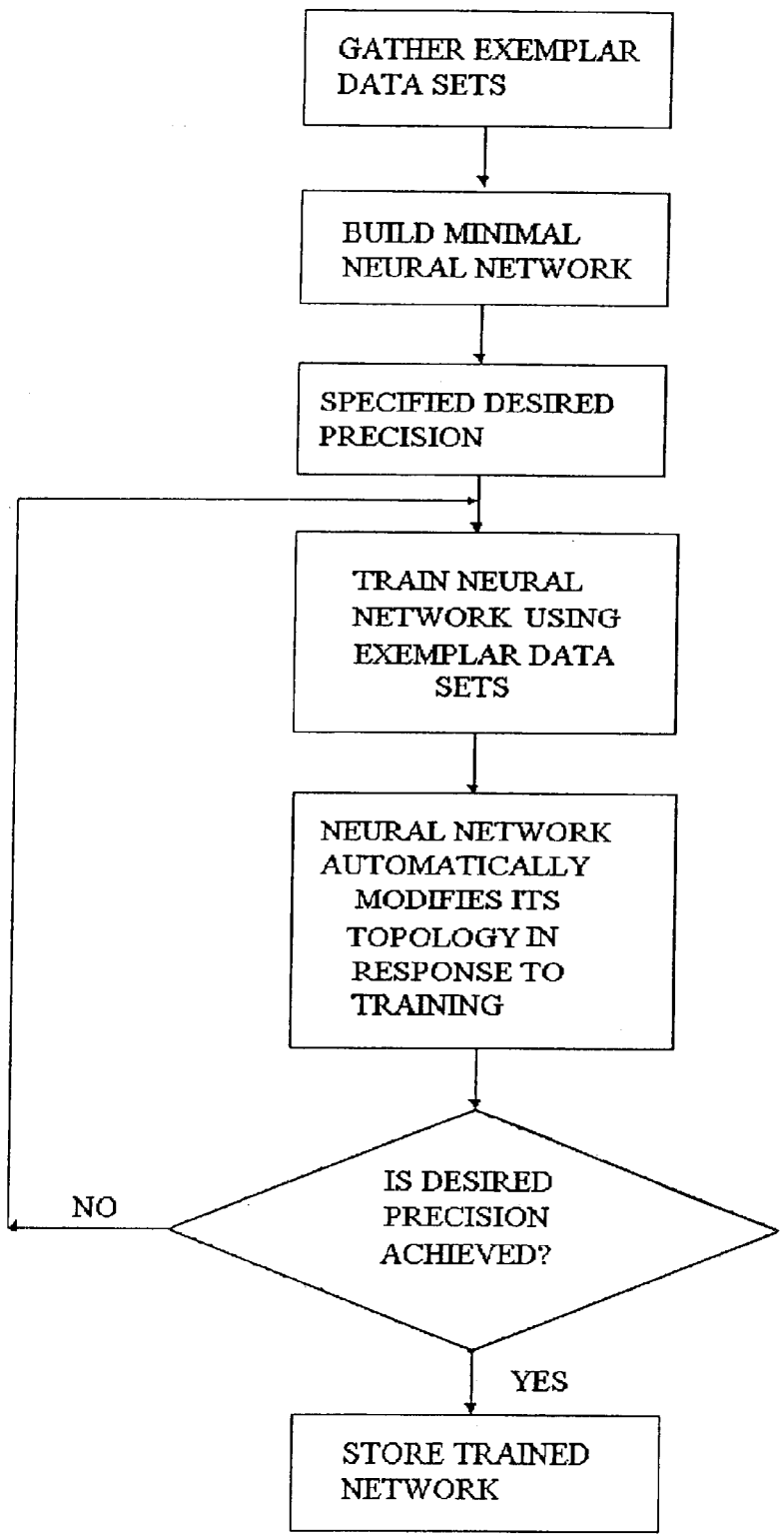
FIG. 3 is a flowchart showing how a neural network of suitable complexity to model the distortion of the given panoramic imaging system is obtained.

FIG. 3 is a flowchart of the process of obtaining the trained neural network 10. First, two data sets are obtained for use in training the network. The first data set consists of the coordinates of a set of respective calibration directions (with respect to the origin point of the optical device of the panoramic imaging system) of corresponding calibration points in a calibration pattern. When the panoramic imaging block is the PAL system, the calibration pattern could for example consist of a regular array of black dots on a white surface which is the interior surface of a cylinder, referred to in the following as a calibration cylinder. The goal is to use a calibration pattern that would make the determination of the respective directions of the calibration points with respect to the origin point of the PAL system, and the matching of these directions to corresponding dots appearing in the distorted panoramic image, as easy as possible.

Thus, it is desirable to have as much contrast as possible between the calibration points and the background of the calibration pattern.

The calibration cylinder is then aligned such as to contain the panoramic imaging block 80, with the optical axis of the PAL system coinciding with the central axis of the cylinder. The length and diameter of the cylinder, and the calibration pattern, are selected such as to ensure that with the panoramic imaging block 80 located approximately at the center of the cylinder, so that the calibration pattern will substantially entirely fill the field of view of the panoramic imaging block 80, i.e., such that the range of calibration directions (in elevation) will at least cover the maximum range of angles of elevation which can be captured by the panoramic imaging block 80. A PAL image of the calibration pattern is then acquired as a set of pixel values (where "pixel value" signifies the luminance/chrominance attribute data for a picture element) for respective positions within the annular planar image 82 shown in FIG. 5.

Aligning the axis of the calibration cylinder with the central axis of the PAL system facilitates the determination (i.e., by measurement or by calculation) of the respective directions of the calibration points with respect to the origin point of the panoramic imaging block 80, and the subsequent matching of these directions to respective locations on the distorted panoramic image which represents the calibration pattern, since all points on the surface of the calibration cylinder will then be at the same radial distance from the central axis of the PAL system. However it would be equally possible to envisage various other arrangements for the calibration pattern, e.g., forming it on the internal faces of an elongated box, etc.

The positions at which the calibration points appear on the PAL image of the calibration pattern are then matched up with the respectively corresponding calibration points in the actual calibration pattern, and the respective calibration directions corresponding to these calibration points (i.e., each measured or calculated as the direction between the origin point 81 of the PAL imaging block 80 and a calibration point) are thereby obtained as a first training data set for use in training the neural network, while these calibration directions are then matched to corresponding locations on the PAL image of the calibration pattern (e.g., with each location expressed as a combination of a radial amount and angular amount), with that set of locations constituting a second training data set.

Each calibration direction is represented by a pair of angular coordinates, $\theta$ (between 0 and 360 degrees) for the azimuth angle and $\phi$ for the elevation angle, within a range which is bisected by the horizon plane.

Figure 8:
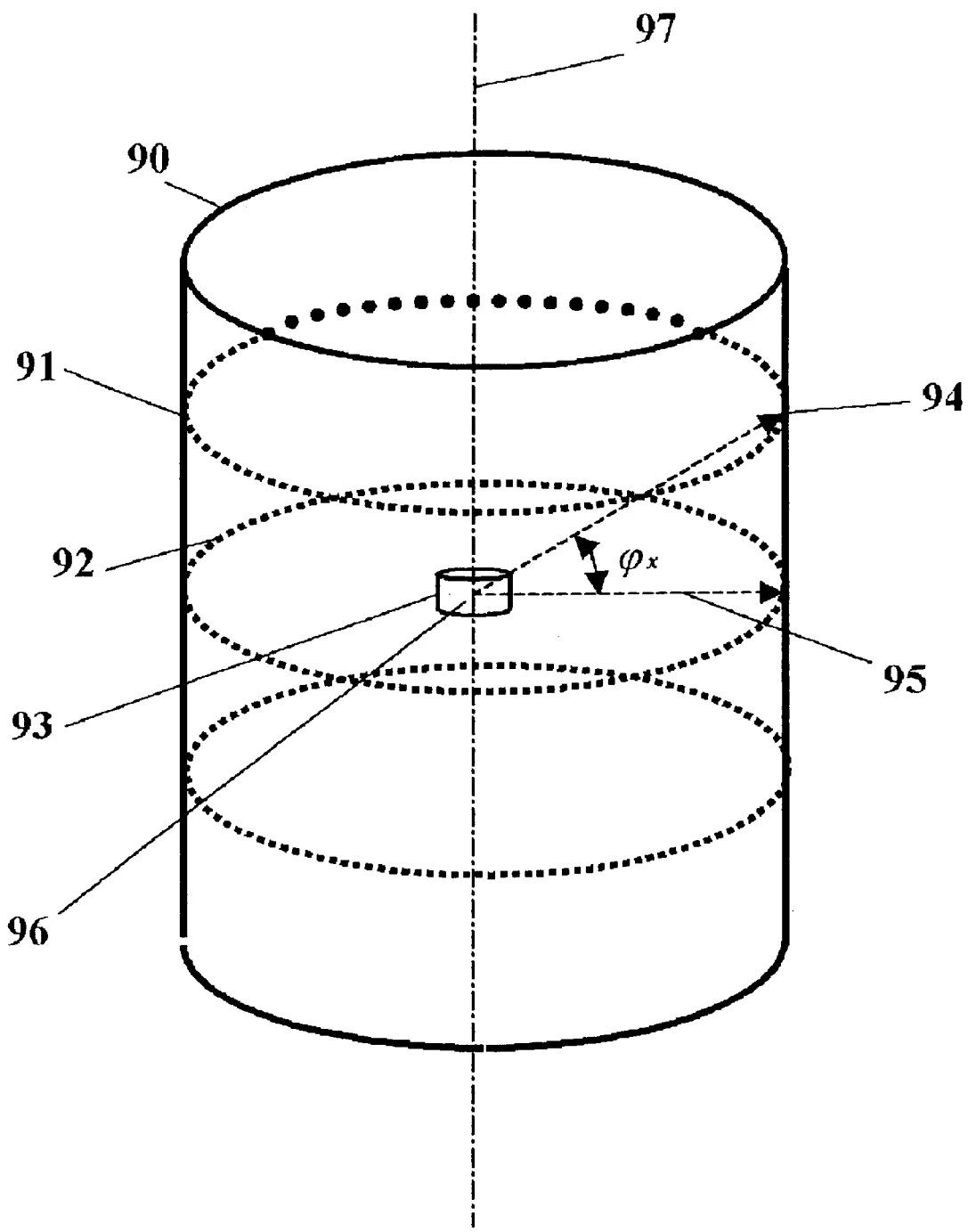
FIG. 8 is a conceptual diagram for use in describing the use of a calibration pattern for training a neural network.

FIG. 8 is a conceptual diagram for illustrating the derivation of such calibration information, in the case of using a calibration pattern which is formed on the inner surface of a cylinder 90. For simplicity of description, the calibration pattern is shown as consisting of only three rings of dots, with a ring 92 being oriented in the horizon plane of a panoramic imaging block 93, which is located within the cylinder 90 as shown, with the axis of the cylinder 90 oriented to coincide with a central optical axis of the panoramic imaging block 93. Numeral 94 designates a calibration point whose view direction, i.e., the direction of the line extending from the origin point 96 of the panoramic imaging block 93 to that point 94, has an elevation angle which is indicated as $\phi X$, and an azimuth direction as indicated by the arrow 95.

With the training data sets obtained as described above, a near-minimal three-layer neural network consisting of 2 input neurons—one each for the lateral and vertical coordinates of the input points, 1 hidden neuron and 2 output neurons—one each for the lateral and vertical coordinates of the output points is then constructed. The weights of the initial hidden neuron are initialized with random values. Back-propagation is used for training. Sigmoid activation functions are used for both the weights and network outputs. The mean squared error function is chosen as a measure of network performance, an upper limit for the mean squared error of the network is then specified and training commenced by successively presenting directions (pairs of angular coordinates) from the first data set as inputs and comparing the response of the network with the expected response in the second data set. One skilled in the art would appreciate that the upper bound set for the mean squared error has an effect on the ultimate size of the network and that the a network bigger than the near-minimal initial network described here is needed for reasonable performance. The size of the network is modified automatically by dynamically adding new hidden neurons over successive training cycles according to the following algorithm:

STEP 1: Evaluate the total error after say, every 100 training epochs

STEP 2: If the total error has not decreased significantly, say by at least 1%, then add a new hidden neuron. Initialize the weights of the new hidden neuron with random weights.

STEP3: Repeat STEP 1 until the target mean squared error is reached.

One of ordinary skill in the art would appreciate that since this algorithm can only add new hidden neurons, the resulting network might have more nodes than are strictly necessary to approximate the inherent distortion of the PAL system to the degree of accuracy indicated by the specified error limit. This situation would impact negatively on the generalization capability of the network and on the speed at which perspective-corrected views could be generated using the network. Thus, the application of the dynamic neuron creation algorithm described earlier should be followed by a pruning stage. Pruning involves removing the most recently added neuron, retraining the network and re-evaluating the error. If the network converges, then another neuron is removed. When the optimum network size has been achieved, the removal of an additional neuron prevents the network from converging. The pruning process stops at this stage.

Although a specific neural network architecture and constructive algorithm has been described here, other network architectures and constructive algorithms could be used without deviating from the present invention.

The neural network 10 is typically simulated on a computer. However, it could be implemented in hardware. When the neural network 10 is simulated on a computer, the training data sets could be read from a text file.

Figure 6:
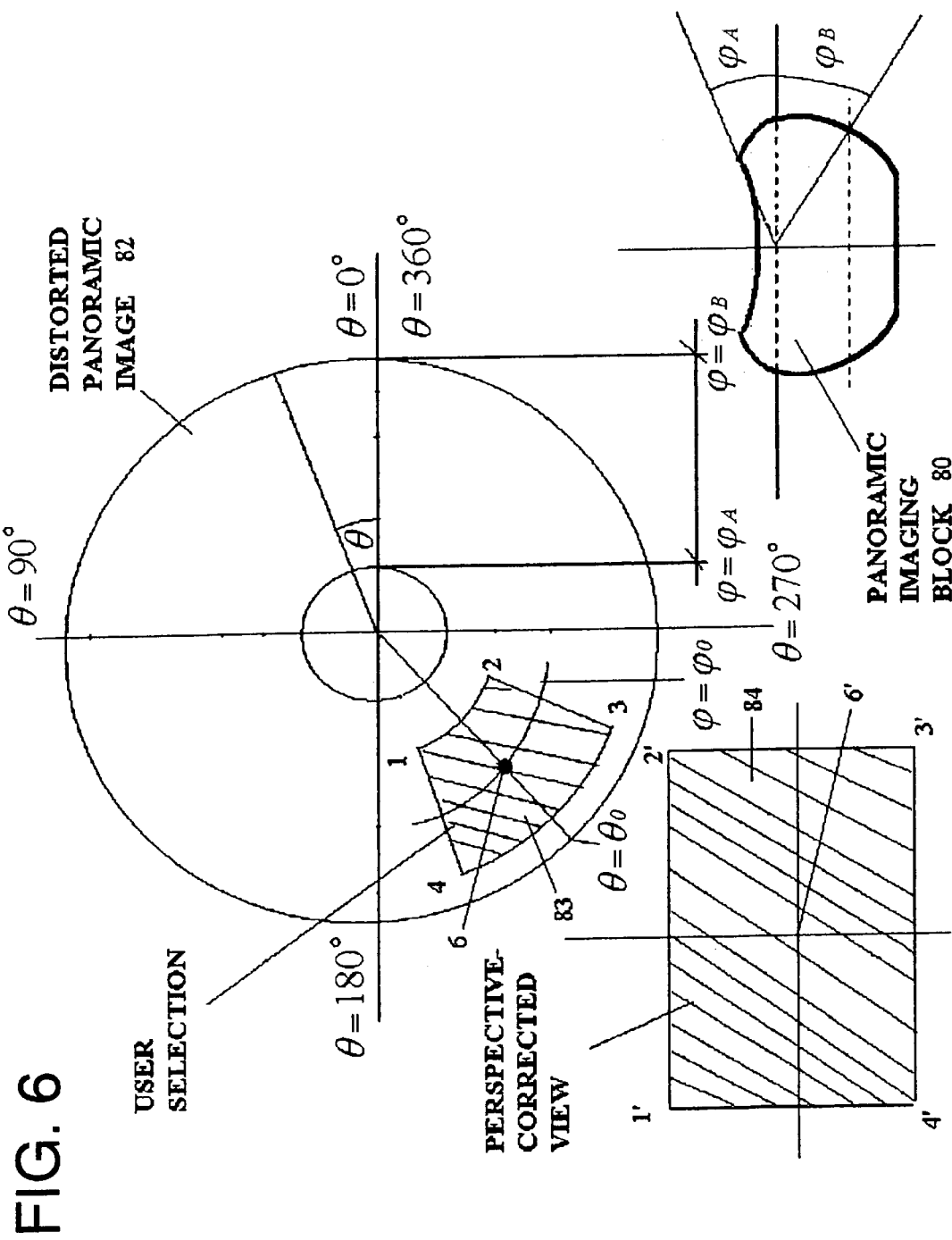
FIG. 6 illustrates how input from a user is used to define a region of interest within an annular panoramic image.
Figure 7:
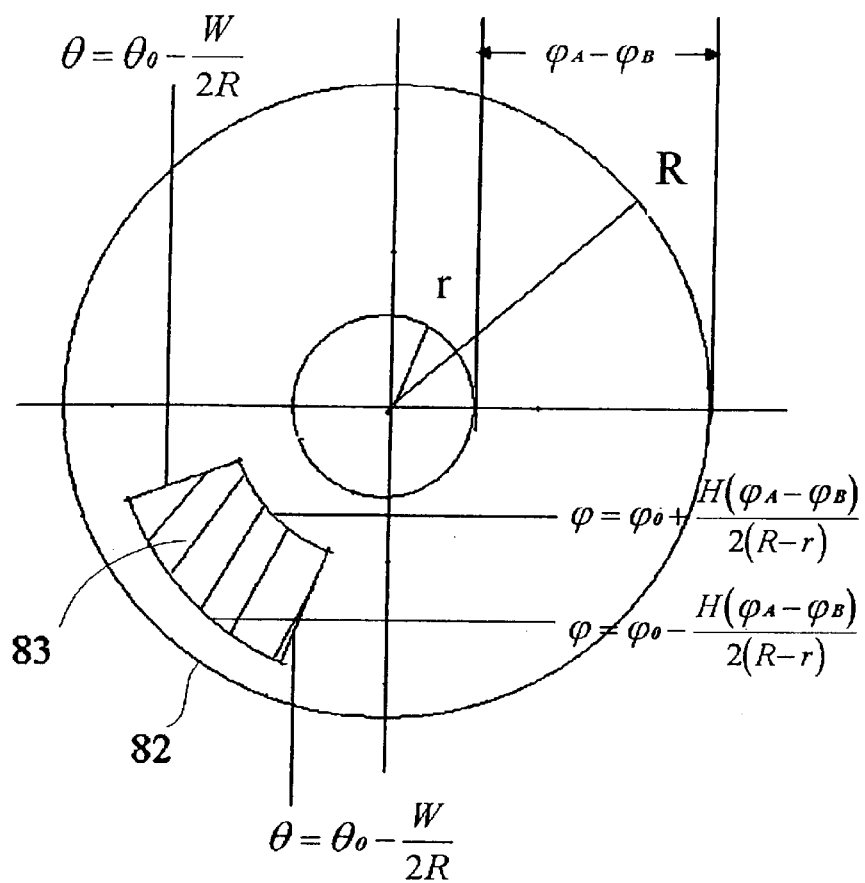
FIG. 7 shows how a linear transformation used to construct a perspective-corrected view from an annular panoramic image.
Figure 7:
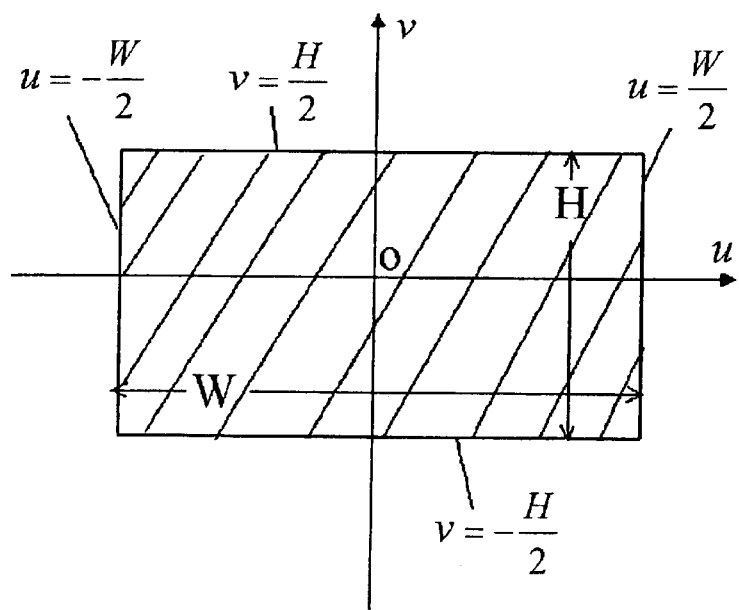

FIGS. 6 and 7 together conceptually illustrate how the user input is transformed into a plurality of undistorted coordinates for use as inputs to the trained neural network. In FIG. 6, numeral 84 denotes a view window, formed of a rectangular array of pixels of a display device such as a CRT, which is to display an undistorted sub-image of a distorted panoramic image. The center pixel position of the view window is designated by numeral 6', and the four corner positions by numerals 1', 2', 3', 4' respectively. It is required to drive the respective pixels of the view window in accordance with the video attributes of a corresponding set of pixels within a distorted panoramic image 82, such as to obtain an undistorted 2-dimensional view of a specific region of an original view which has been captured as the panoramic image 82. It is assumed that the user has specified a view direction for the view window (i.e., a pair of angular coordinates representing a direction with respect to the origin point of the panoramic imaging block 80 at the time of capturing the distorted panoramic image) which, when inputted to the neural network, results in the pixel position 6 within the distorted panoramic image 82 being specified as the output response data from the neural network (i.e., as a combination of a radial value and an angular value). It is now necessary to derive, for each of the other pixels of the view window 84, a corresponding view direction (i.e., pair of angular coordinates) to be inputted to the neural network, to thereby obtain from the neural network output a corresponding location within the distorted panoramic image 82. In that way, all of the locations within the distorted sub-image 83 respectively corresponding to the pixels of the view window 84 can be obtained. In FIG. 6, the region 83 represents the set of positions (within the PAL image) which respectively correspond to a set of view directions that are derived (using simple transformation equations as described hereinafter) for respective pixel positions in the view window 84.

The aforementioned direction specified by the user for the center position of the view window will be expressed by the coordinates $\theta=\theta_0$ and $\phi=\phi_0$ as indicated in FIG. 6. For simplicity, it will be assumed that the zoom level is 1.0 and that the view window specified by the user has a width of W pixels and a height of H pixels, with the view window represented as a region within a U-V plane as in FIG. 7, and with the origin of that U-V plane corresponding to the center point 6' of the view window 84 in FIG. 6. The length of the outer circumference of the PAL image (i.e., with the length of the outer radius R expressed as a number of pixels of that image) is $2\pi R$, and this corresponds to an angular range of $2\pi$ radians. That is, the pixel pitch as measured around the circumference of the PAL image corresponds to $1/R$ radians. Hence, for a zoom level of 1.0, the pixel pitch within the view window 84, as measured along the U-axis, corresponds to an angular amount of $1/R$ radians in azimuth. Assigning the entire azimuth angular range of $2\pi$ radians to the outer circumference of the PAL image ensures that every pixel in the input PAL image is used at least once by the transformation, that is, no image data in the distorted panoramic image 82 is left unused.

Similarly, the entire radial span [i.e. (R−r) pixels] of the PAL image 82 corresponds to the vertical field of view $\phi_A-\phi_B$ of the PAL system. Positive values are assigned to angles of elevation which are greater than zero, such as $\phi_A$, while negative values are assigned angles of elevation which are below the horizon, such as $\phi_B$. Hence, the vertical field of view, $\phi_A-\phi_B$ is positive. Thus, one pixel pitch as measured along the V-axis of the sub-image in the view window 84 corresponds to an angular amount of $$\frac{\varphi_A - \varphi_B}{R - r}$$

radians (in elevation).

Therefore, for any pixel position within the view window 84, expressed as a (u, v) coordinate pair, the corresponding ($\phi_u, \phi_v$) coordinate pair for use as input to the trained neural network can be computed as follows:

$$\theta_u = \theta_0 + \frac{1}{R}u \quad (2)$$

$$\varphi_v = \varphi_0 + \frac{(\varphi_A - \varphi_B)}{R-r}v \quad (3)$$

Equations (2) and (3) are valid (given a zoom level of 1.0) under the following conditions:

$$0 \leq \theta_0 \leq 2\pi \quad (4)$$

$$\phi_B \leq \phi_0 \leq \phi_A \quad (5)$$

$$W \leq 2\pi R \quad (6)$$

$$H \leq (R-r) \quad (7)$$

The above can be readily understood by referring to the simple conceptual diagram of FIG. 9, in which numeral 100 denotes an annular panoramic image, represented by stored data as described hereinabove, which for the purpose of explanation is assumed to have three rings of pixels, with the aforementioned angular amount 1/R being B/8 radians and with the angular amount $(v_A-v_B)/(R-r)$ also being B/8 radians. (An actual annular image of course is expressed as a continuous array of pixels, with maximum angular resolution at the periphery). For simplicity of description, only a part of the pixels are shown. The relationships shown in FIG. 9 between pixel positions in the annular image and respective view directions would be true in the case of an image which has been captured by an ideal (optical distortion-free) imaging system.

Figure 9:
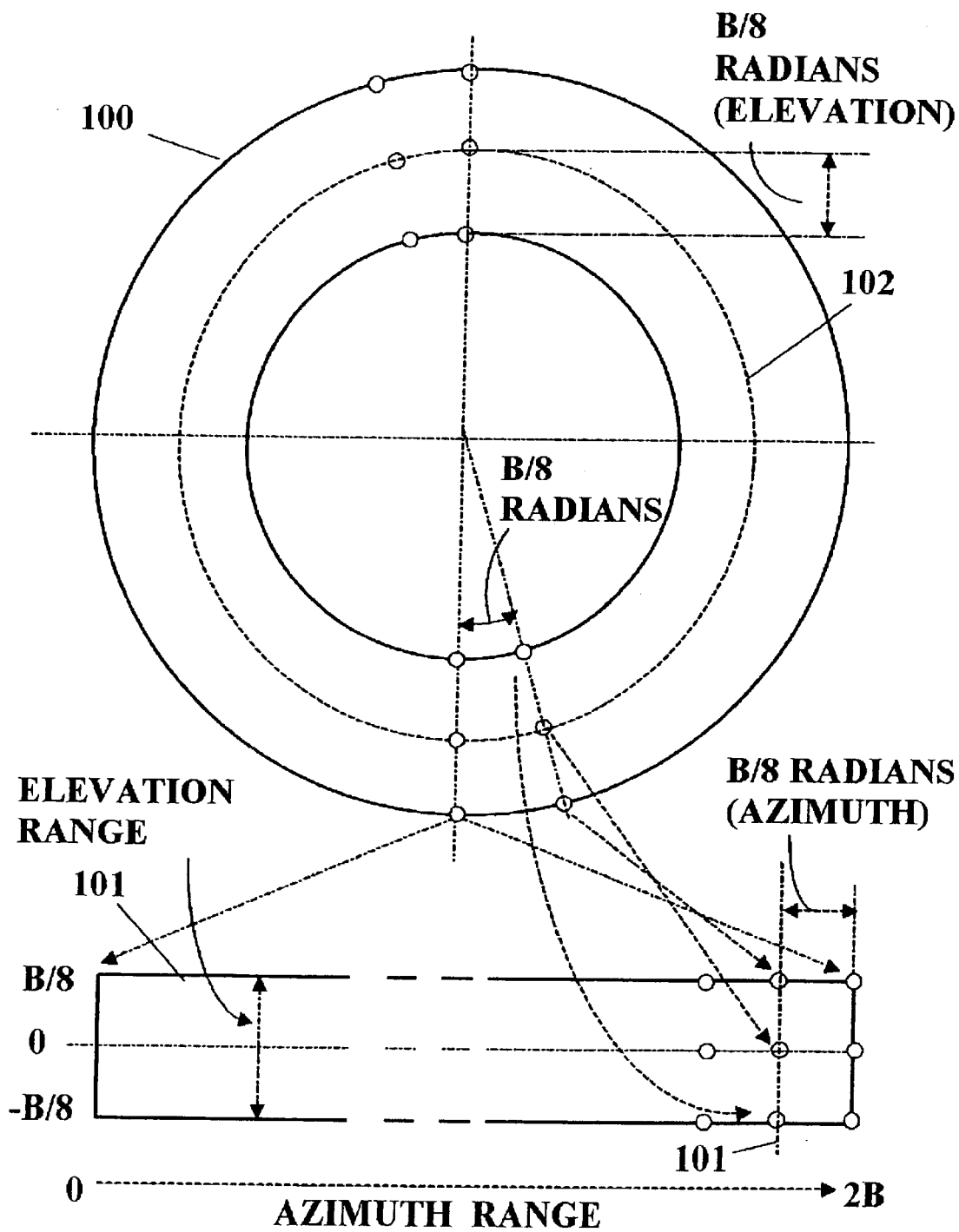
FIG. 9 is a conceptual diagram illustrating the mapping of pixel positions in an annular panoramic image onto corresponding positions in a rectangular array of pixels.

The locus of locations of pixels within the annular image which correspond to directions in the horizon plane is the central ring 102 in FIG. 9. The region 101 represents a transformation of the entire planar annular image 101 into a planar rectangle, i.e., a rectangular array of pixels with a 1:1 correspondence between the pixels in the annular image 100 and the pixels of the rectangular region 101 (when the zoom level is 1.0). Thus the height of region 101, which is twice the display pixel pitch, is equivalent to B/4 radians of elevation angle, and the lateral width of region 101 is 16 times the display pixel pitch (since pixels at the outer periphery of the annular image divide it into 16 sectors), equivalent to 2B radians of azimuth angle. Thus if in this very simple example a display sub-image were to be obtained as a 3-by-3 array of 9 pixels, such as that having as its center column the column 101 in FIG. 9, the pixel pitch in the horizontal direction of the sub-image would correspond to an angular amount of B/8 radians in azimuth, while as measured along the vertical direction of the display, the pixel pitch would correspond to an angular amount of B/8 radians in elevation. It can be understood that to ensure accurate reproduction of shapes as viewed in an original real-world scene, the relationship between the ratio r/R (expressed as respective numbers of pixels) of the annular image and the elevation angle range $(v_A-v_B)$, in radians, should be such that 1/R is substantially equal to $(v_A-v_B)/(R-r)$.

It is a rather straightforward matter to incorporate a zoom level other than 1.0 into equations (2) and (3), it involves scaling the coordinates by the zoom level. Furthermore, the zoom level could be used to eliminate conditions (6) and (7).

Respective view directions corresponding to the pixel positions in the view window 84, each view direction expressed as a pair of angular coordinate values obtained in equations (2) and (3), are then successively inputted to the trained neural network to thereby obtain, as output responses from the neural network, corresponding position information (i.e., respective pairs of radial direction/angular amount values) specifying the locations within the distorted panoramic image 82 that respectively correspond to these view directions. At each of the locations which are thus specified within the distorted panoramic image 82, the video attributes of the distorted panoramic image 82 at that location are extracted, and are supplied to a display device such as the display system 70 in FIG. 4, which generates the view window 84, to be set as the video attributes of the corresponding pixel within the view window 84.

It will be understood that it would be equally possible for a user to modify the set of values which are derived by using equations (2), (3) above before inputting these to the neural network, such as to specify some arbitrary orientation for the display image, i.e., by applying simple rotation and appropriate affine transformations on the coordinates.

Since the response of the trained neural network is non-integral (i.e., if sigmoid activation functions are used), suitable interpolation schemes such as bilinear interpolation could be applied.

Obtaining the response of the trained neural network primarily involves a simple series of additions and multiplications using equation (1) for each neuron and starting from the input layer until the output layer is reached. For a three-layer network containing 2 input neurons and 8 hidden neurons, the computation of a coordinate would require a total of 24 multiplications and 22 additions. For applications requiring very high precision and thus resulting in the generation of relatively large neural networks, a specialized hardware unit could be used to carry out the multiplications and additions in real time.

However, for applications where precision is not critical, such as interactive viewing of the panoramas, the speed of generation of perspective-corrected views could be increased by several orders of magnitude by defining coordinates of a regular array of control points covering the entire area of the view window 84, and calculating only respective pairs of angular coordinates (to be inputted to the neural network) for these control points, and thereby obtaining from the neural network information specifying corresponding locations within the distorted panoramic image. In that case, it is possible to use bilinear interpolation to specify the respective locations within the distorted panoramic image that correspond to pixels of the view window other than those pixels which are positioned at the control points. As a simple example, when the neural network has been used to obtain four locations within the distorted panoramic image which respectively correspond to four mutually adjacent ones of the control points, then interpolation could be applied to that location information to obtain approximate location information which corresponds to a pixel that is located centrally with respect to the four control points in the display window.

Hence, it becomes unnecessary to use the neural network to derive location information (with respect to the distorted panoramic image) for all of the pixels of the view window. One of ordinary skill in the art will appreciate that the higher the number of control points, the more accurate the results and that increasing the number of control points to the number of pixels in the output image causes the scheme to degenerate into requiring the computation of all coordinates using the trained neural network. Other optimization schemes could also be employed.

One skilled in the art will appreciate that the method described herein could be further optimized by dividing the input image into partitions and using smaller networks to learn and later correct the characteristic distortions of the resulting partitions.

Although a 2D to 2D input-output mapping was used in the description of the preferred embodiment of the present invention, it should be clear to one of ordinary skill in the art that the method presented here could be applied to an input-output mapping of any combination of dimensions.

Furthermore, the distorted panoramic image is not limited to a panoramic image of a real world scene but could be a synthesized scene.

Moreover the principles described above are not limited in application to a panoramic imaging system having a 360 degrees range of view directions in azimuth, but could equally be applied to wide-angle imaging systems in general. As can be understood from the above description, these principles can be summarized as follows:

(1) Using a real-world scene constituting a calibration pattern, use a panoramic imaging system to capture a calibration (distorted) panoramic image. Relate each point in an array of visible calibration points in that pattern to corresponding view directions of the imaging system, and match the respective locations of the calibration points (as they appear within the calibration image) to the corresponding view directions. Train a neural network, using the view directions for the calibration points as training inputs and using the corresponding locations of the calibration points in the calibration image for comparison with output responses from the neural network, to obtain error quantities for use in modifying the neural network parameters.

(2) After training of the neural network is completed, capture a distorted panoramic image of an arbitrary real-world scene. Specify a view direction for a central pixel of a rectangular array of pixels which are to constitute a sub-image. For each of the other pixels of the sub-image calculate a corresponding view direction based upon the view direction of the central pixel and the position of that other pixel with respect to the central pixel, and upon relationships between the radial proportions and the range of view directions in elevation of the panoramic image.

(3) Successively input each of these view directions (e.g., as pairs of angular coordinates) to the trained neural network, to thereby obtain information specifying locations within the distorted panoramic image that respectively correspond to these view directions. At each of these locations, extract the video attributes of a pixel of the wide-angle image, and assign these attributes to a pixel in the sub-image (i.e., to a pixel whose view direction corresponds to that location).

Although the foregoing description of the preferred embodiment of the present invention mentions specific devices and algorithms, it should be apparent to one of ordinary skill in the art that numerous alternative embodiments and equivalents including a computer-usable medium storing computer executable instructions for implementing the disclosed method, exist which do not depart from the present invention. It is therefore to be understood that the present invention is not to be limited by the description set forth above, but by the appended claims.

What is claimed is:

1. A method of navigating within a distorted panoramic image by selectively extracting undistorted sub-images from said distorted panoramic image, comprising steps of:

training a neural network to relate respective view directions of a panoramic imaging system to corresponding positions within a distorted panoramic image that is captured by said panoramic imaging system;

specifying a central view direction for a desired sub-image of an arbitrary distorted panoramic image that has been captured by said panoramic imaging system, with said sub-image generated by a rectangular array of pixels of a display device;

based on a known field of view of said panoramic imaging system and on a configuration of said arbitrary distorted panoramic image, expressing a lateral distance in said array equal to a pixel pitch of said array as an equivalent amount of view direction displacement in azimuth, expressing a vertical distance in said array equal to said pixel pitch as an equivalent amount of view direction displacement in elevation, and calculating respective view directions corresponding to said pixels, based on said equivalent amounts of view direction displacement and said central view direction;

successively inputting said calculated view directions to said neural network to thereby obtain information specifying respectively corresponding locations within said arbitrary distorted panoramic image; and obtaining respective video attributes for each of said locations and assigning said video attributes to corresponding ones of said pixels, to thereby generate said sub-image.

2. The method according to claim 1, wherein said step of training said neural network comprises steps of:

preparing a calibration pattern which defines an array of visible calibration points, with dimensions and a shape of said calibration pattern being predetermined to enable said calibration pattern to be oriented substantially completely occupying said field of view of said panoramic imaging system;

disposing said calibration pattern to substantially completely occupy said field of view and capturing a distorted panoramic image of said calibration pattern, to constitute a calibration image;

generating a first set of data which relates each of said calibration points to a corresponding view direction with respect to said panoramic imaging system;

generating a second set of data which relates each of said calibration points to a corresponding location at which said calibration point appears within said calibration image; and performing a repetitive training process of successively inputting data expressing said view directions from said first data set to said neural network, comparing each output response produced from said neural network with data expressing a corresponding location within said calibration image, obtained from said second data set, to thereby obtain an error amount, and applying said error amount in accordance with a predetermined algorithm to modify internal parameters of said neural network, with said training process being continued until said error amounts reach a predetermined permissible level.

3. The method according to claim 2, wherein said calibration pattern is formed on an internal surface of a cylinder and said panoramic imaging system includes an optical lens unit having a central optical axis, and wherein said central optical axis is oriented to substantially coincide with an axis of said cylinder while capturing said calibration image.

4. An apparatus for navigating within a distorted panoramic image by selectively extracting undistorted sub-images from said distorted panoramic image, comprising:

a panoramic imaging system adapted to capture a real-world scene as a distorted panoramic image;

a calibration pattern defining an array of visible calibration points, adapted to be oriented such as to substantially occupy a field of view of said panoramic imaging system with said calibration points arranged at respectively different view directions with respect to said panoramic imaging system;

a neural network, and means for training said neural network to relate respective view directions of said panoramic imaging system to corresponding locations within an arbitrary distorted panoramic image captured by said panoramic imaging system, said training utilizing a calibration image which has been captured as an image of said calibration pattern, and being based upon said view directions of said calibration points in conjunction with respective locations at which said calibration points appear within said calibration image;

display means having a plurality of pixels arrayed with a fixed pitch, for generating a sub-image extracted from an arbitrary distorted panoramic image which is captured by said panoramic imaging system subsequent to training of said neural network; and data processing means responsive to externally supplied information specifying a central view direction for a desired sub-image of said arbitrary distorted panoramic image, for expressing a lateral distance in said array equal to said pixel pitch as an equivalent amount of view direction displacement in azimuth and expressing a vertical distance in said array equal to said pixel pitch as an equivalent amount of view direction displacement in elevation, based on a known field of view of said panoramic imaging system and a configuration of said arbitrary distorted panoramic image, and calculating respective view directions corresponding to the pixels of said array, based on said equivalent amounts and said central view direction;

successively inputting said calculated view directions to said neural network to thereby obtain information specifying respectively corresponding locations within said arbitrary distorted panoramic image; and obtaining respective video attributes for each of said locations, and assigning said video attributes to corresponding ones of said array of pixels, to thereby generate said sub-image.

5. The apparatus according to claim 4, wherein said means for training said neural network comprises:

means for generating a first set of data which relates each of said calibration points to a corresponding one of said view directions;

means for generating a second set of data which relates each of said calibration points to a corresponding location at which said calibration point appears within said calibration image; and means for performing a repetitive training process of successively inputting data expressing said view directions from said first data set to said neural network, comparing each output response produced from said neural network with data expressing a corresponding location within said calibration image, obtained from said second data set, to thereby obtain an error amount, and applying said error amount in accordance with a predetermined algorithm to modify internal parameters of said neural network, with said training process being continued until said error amounts reach a predetermined permissible level.

6. The apparatus according to claim 4, wherein said calibration pattern is formed on an internal surface of a cylinder and said panoramic imaging system includes an optical lens unit having a central optical axis which is oriented to coincide with an axis of said cylinder while capturing said calibration image.

7. A computer-usable medium storing computer-executable instructions, said instructions when executed implementing a method of navigating within a distorted panoramic image by selectively extracting undistorted sub-images from said distorted panoramic image, comprising steps of:

training a neural network to relate respective view directions of a panoramic imaging system to corresponding positions within a distorted panoramic image that is captured by said panoramic imaging system;

specifying a central view direction for a desired sub-image of an arbitrary distorted panoramic image that has been captured by said panoramic imaging system, with said sub-image generated by a rectangular array of pixels of a display device;

based on a known field of view of said panoramic imaging system and on a configuration of said arbitrary distorted panoramic image, expressing a lateral distance in said array equal to a pixel pitch of said array as an equivalent amount of view direction displacement in azimuth, expressing a vertical distance in said array equal to said pixel pitch as an equivalent amount of view direction displacement in elevation, and calculating respective view directions corresponding to said pixels, based on said equivalent amounts of view direction displacement and said central view direction;

successively inputting said calculated view directions to said neural network to thereby obtain information specifying respectively corresponding locations within said arbitrary distorted panoramic image; and obtaining respective video attributes for each of said locations and assigning said video attributes to corresponding ones of said pixels, to thereby generate said sub-image.

8. The computer-usable medium according to claim 7, wherein said step of training said neural network comprises steps of:

preparing a calibration pattern which defines an array of visible calibration points, with dimensions and a shape of said calibration pattern being predetermined to enable said calibration pattern to be oriented substantially completely occupying said field of view of said panoramic imaging system;

disposing said calibration pattern to substantially completely occupy said field of view and capturing a distorted panoramic image of said calibration pattern, to constitute a calibration image;

generating a first set of data which relates each of said calibration points to a corresponding view direction with respect to said panoramic imaging system;

generating a second set of data which relates each of said calibration points to a corresponding location at which said calibration point appears within said calibration image; and performing a repetitive training process of successively inputting data expressing said view directions from said first data set to said neural network, comparing each output response produced from said neural network with data expressing a corresponding location within said calibration image, obtained from said second data set, to thereby obtain an error amount, and applying said error amount in accordance with a predetermined algorithm to modify internal parameters of said neural network, with said training process being continued until said error amounts reach a predetermined permissible level.

9. The computer-usable medium according to claim 7, wherein said calibration pattern is formed on an internal surface of a cylinder and said panoramic imaging system includes an optical lens unit having a central optical axis, and wherein said central optical axis is oriented to substantially coincide with an axis of said cylinder while capturing said calibration image.

* * * * *